United States Patent
Kim et al.

(10) Patent No.: US 9,991,937 B2
(45) Date of Patent: Jun. 5, 2018

(54) CARD DETECTION DEVICE HAVING A MAGNETIC FIELD MONITOR, SYSTEM INCLUDING THE DEVICE, AND METHOD OF OPERATING THE DEVICE

(71) Applicant: SAMSUNG ELECTRONICS CO., LTD., Suwon-si, Gyeonggi-do (KR)

(72) Inventors: Jun Ho Kim, Yongin-si (KR); Hyuk Sang Choi, Seoul (KR); Chol Su Yoon, Yongin-si (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 268 days.

(21) Appl. No.: 14/659,980

(22) Filed: Mar. 17, 2015

(65) Prior Publication Data

US 2015/0270876 A1 Sep. 24, 2015

(30) Foreign Application Priority Data

Mar. 18, 2014 (KR) .................... 10-2014-0031735

(51) Int. Cl.
*H04W 12/06* (2009.01)
*H04B 5/00* (2006.01)

(52) U.S. Cl.
CPC ......... *H04B 5/0081* (2013.01); *H04B 5/0031* (2013.01); *H04B 5/0056* (2013.01)

(58) Field of Classification Search
CPC ..... H04W 12/06; H04W 4/008; H04W 12/08; H04W 12/04; H04W 84/12; H04W 88/02; H04W 12/02; H04W 4/02; H04W 76/023; G01R 31/3606; G01R 31/3679; G01R 31/3658; G01R 31/3627; G01R 31/3624; G01R 31/3651; G01R 31/3662; G01R 31/3641; G01R 31/3696; G01R 31/3644; G01R 31/3689; G01R 19/16542
USPC ............ 455/411, 517, 574, 556.1, 558, 41.1, 455/67.11, 226.1; 324/654, 629, 426, 324/693, 445, 76.75, 207.15, 239, 144
See application file for complete search history.

(56) References Cited

U.S. PATENT DOCUMENTS

| | | | |
|---|---|---|---|
| 7,710,345 | B2 | 5/2010 | Terry |
| 7,881,665 | B2 | 2/2011 | Symons |
| 2009/0273454 | A1 | 11/2009 | Onozuka et al. |
| 2011/0165862 | A1 | 7/2011 | Yu et al. |
| 2011/0300808 | A1 | 12/2011 | Rokhsaz et al. |

(Continued)

FOREIGN PATENT DOCUMENTS

| | | |
|---|---|---|
| JP | 2001-094485 | 4/2001 |
| JP | 2005-073113 | 3/2005 |

(Continued)

*Primary Examiner* — Jermele M Hollington
*Assistant Examiner* — Taqi Nasir
(74) *Attorney, Agent, or Firm* — F. Chau & Associates, LLC

(57) ABSTRACT

A detection device is provided. The detection device includes a transmitter and a detector. The transmitter supplies an induced current to an antenna and to adjust a strength of an induced voltage generated in the antenna by adjusting the induced current. The detector monitors the strength of the induced voltage of the antenna and generates a control signal for controlling the induced current to the antenna based on the monitored strength of the induced voltage of the antenna.

20 Claims, 14 Drawing Sheets

(56) References Cited

U.S. PATENT DOCUMENTS

| | | | | |
|---|---|---|---|---|
| 2012/0003930 A1* | 1/2012 | Lefley | ............... | G06K 7/0008 |
| | | | | 455/41.1 |
| 2012/0106219 A1* | 5/2012 | Okuda | ............... | G06K 7/10237 |
| | | | | 363/127 |
| 2012/0217971 A1* | 8/2012 | Deluca | ............... | H04B 5/0043 |
| | | | | 324/426 |
| 2012/0329389 A1* | 12/2012 | Royston | ............... | H04B 5/0062 |
| | | | | 455/41.1 |
| 2013/0285681 A1* | 10/2013 | Wilson | ............... | G01N 27/00 |
| | | | | 324/693 |
| 2013/0337744 A1* | 12/2013 | Lefley | ............... | H04B 5/00 |
| | | | | 455/41.1 |
| 2014/0125355 A1* | 5/2014 | Grant | ............... | B64D 11/06 |
| | | | | 324/629 |

FOREIGN PATENT DOCUMENTS

| | | |
|---|---|---|
| JP | 2006-085413 | 3/2006 |
| JP | 2012-060610 | 3/2012 |
| JP | 2012-114822 | 6/2012 |

\* cited by examiner

CARD DETECTION DEVICE HAVING A MAGNETIC FIELD MONITOR, SYSTEM INCLUDING THE DEVICE, AND METHOD OF OPERATING THE DEVICE

CROSS-REFERENCE TO RELATED APPLICATION

This application claims priority under 35 U.S.C. §119 to Korean Patent Application No. 10-2014-0031735, filed on Mar. 18, 2014 in the Korean Intellectual Property Office, the disclosure of which is incorporated by reference herein in its entirety.

TECHNICAL FIELD

The present inventive concept relates to an electronic circuit, and more particularly, to a card detection device having a magnetic field monitor, a system including the device, and a method of operating the device.

DISCUSSION OF THE RELATED ART

Near field communication (NFC) systems may include an NFC device (e.g., a reader) and an NFC tag (e.g., a card). The NFC device may communicate with the NFC tag when the NFC tag exists in a reading range (e.g., 10 cm or less) of the NFC reader.

To reduce power consumption, the NFC device working as a reader may be in a power-down state when the NFC tag is not within the reading range of the NFC reader, and may wake up to switch to a power-up state when the NFC tag is within the reading range of the NFC reader. To this end, the NFC device may make a decision as to whether or not the NFC tag is within the reading range of the NFC reader by detecting a change in a level of a magnetic field through an antenna of the NFC reader before and after the NFC tag comes into the reading range of the NFC reader.

However, the level of the magnetic field may vary depending on, for example, sizes or characteristics of an antenna, a matching circuit, and/or a resonant frequency of a provided NFC device or NFC tag. The level of the magnetic field may exceed an operable range of a card detection circuit in the NFC reader which may reduce the performance of the NFC device.

SUMMARY

According to an exemplary embodiment of the present inventive concept, there is provided a detection device. The detection device includes a transmitter and a detector. The transmitter supplies an induced current to an antenna and adjusts a strength of an induced voltage generated in the antenna by adjusting the induced current. The detector monitors the strength of the induced voltage of the antenna and generates a control signal for controlling the induced current to the antenna based on the monitored strength of the induced voltage of the antenna.

In an exemplary embodiment of the present inventive concept, the detector may include a rectifier, an attenuator, and a detection block. The rectifier may rectify the induced voltage and generate a rectified voltage. The attenuator may attenuate the rectified voltage and generate an attenuated voltage. The detection block may compare at least one voltage generated based on the attenuated voltage with at least one reference voltage, and generate the control signal based on the comparison result.

In an exemplary embodiment of the present inventive concept, the detection block may include a first comparator, a second comparator, and a controller. The first comparator may compare a first voltage obtained by dividing the attenuated voltage with a first reference voltage. The second comparator may compare a second voltage obtained by dividing the attenuated voltage with a second reference voltage. The controller may generate the current control signal based on output signals of the first and second comparators.

In an exemplary embodiment of the present inventive concept, the detector may include a rectifier, an attenuator, and a detection block. The rectifier may rectify the induced voltage and generate a rectified voltage. The attenuator may attenuate the rectified voltage and generate an attenuated voltage. The detection block may compare a digital signal generated based on the attenuated voltage with at least one reference code and generate the control signal based on the comparison result.

In an exemplary embodiment of the present inventive concept, the detection block may include an analog-to-digital converter and a central processing unit. The analog-to-digital converter may convert the attenuated voltage from an analog signal into the digital signal. The central processing unit may compare the digital signal with a predetermined minimum code and a predetermined maximum code, and to generate the control signal.

In an exemplary embodiment of the present inventive concept, the detector may generate the control signal for increasing the induced current until the strength of the induced voltage is at least a predetermined first strength.

In an exemplary embodiment of the present inventive concept, the detector may generate the control signal for decreasing the induced current until the strength of the induced voltage is equal to or less than a predetermined second strength. The predetermined second strength may be greater than the predetermined first strength.

In an exemplary embodiment of the present inventive concept, the transmitter may include a driver and a current controller. The driver may include at least one pull-up transistor and at least one pull-down transistor. The driver may drive the induced current. The current controller may control the driver in response to the control signal.

In an exemplary embodiment of the present inventive concept, the current controller may control at least one among a power supply voltage applied to the driver, or gate voltages of the at least one pull-up transistor and at least one pull-down transistor in response to the control signal.

In an exemplary embodiment of the present inventive concept, the detection device may detect whether a near-far field communication (NFC) device is positioned within a predetermined range of the detection device and to communicate with the NFC device.

In an exemplary embodiment of the present inventive concept, the NFC device may be a card including an NFC chip.

According to an exemplary embodiment of the present inventive concept, there is provided a communication system. The communication system includes an antenna, a card detection device, and a receiver. The card detection device supplies an induced current to the antenna, monitors a strength of an induced voltage of the antenna, adjusts the strength of the induced voltage generated in the antenna by adjusting the induced current supplied to the antenna, detects whether a card is positioned within a predetermined range of the communication system, and generates a wake-up signal. The receiver is in a power-down state when the card is positioned out of the predetermined range of the communication system. The receiver wakes up in response to the wake-up signal and communicates with the card.

In an exemplary embodiment of the present inventive concept, the card detection device may monitor the strength of the induced voltage of the antenna and adjust the induced current to a target current in a current adjusting mode. The card detection device may detect whether the card is positioned within the predetermined range of the communication system in a mode which is not the current adjusting mode.

In an exemplary embodiment of the present inventive concept, the card detection device may include a transmitter and a card detector. The transmitter may adjust the strength of the induced voltage generated in the antenna by adjusting the induced current. The card detector may monitor the strength of the induced voltage of the antenna and generate a control signal for controlling the induced current to the antenna based on the monitored strength of the induced voltage of the antenna.

In an exemplary embodiment of the present inventive concept, the card detector may include a rectifier, an attenuator, and a detection block. The rectifier may rectify the induced voltage and generate a rectified voltage. The attenuator may attenuate the rectified voltage and generate an attenuated voltage. The detection block may compare at least one voltage generated based on the attenuated voltage with at least one reference voltage and generate the control signal based on the comparison result.

In an exemplary embodiment of the present inventive concept, the detection block may include a first comparator, a second comparator, and a controller. The first comparator may compare a first voltage obtained by dividing the attenuated voltage with a first reference voltage. The second comparator may compare a second voltage obtained by dividing the attenuated voltage with a second reference voltage. The controller may generate the current control signal based on output signals of the first and second comparators.

In an exemplary embodiment of the present inventive concept, the card detector may include a rectifier, an attenuator, and a detection block. The rectifier may rectify the induced voltage and generate a rectified voltage. The attenuator may attenuate the rectified voltage and generate an attenuated voltage. The detection block may compare a digital signal generated based on the attenuated voltage with at least one reference code and generate the control signal based on the comparison result.

In an exemplary embodiment of the present inventive concept, the detection block may include an analog-to-digital converter and a central processing unit. The analog-to-digital converter may convert the attenuated voltage from an analog signal into the digital signal. The central processing unit may compare the digital signal with a predetermined minimum code and a predetermined maximum code, and generate the control signal.

In an exemplary embodiment of the present inventive concept, the card detector may generate the control signal for increasing the induced current until the strength of the induced voltage is at least a predetermined first strength. The card detector may generate the control signal for decreasing the induced current until the strength of the induced voltage is equal to or less than a predetermined second strength. The predetermined second strength may be greater than the predetermined first strength.

In an exemplary embodiment of the present inventive concept, the transmitter may include a driver and a current controller. The driver may include at least one pull-up transistor and at least one pull-down transistor. The driver may drive the induced current. The current controller may control at least one among a power supply voltage applied to the driver, or gate voltages of the at least one pull-up transistor and at least one pull-down transistor in response to the control signal.

According to an exemplary embodiment of the present inventive concept, there is provided a method of operating a communication system. The communication system includes a transmitter and an antenna. The method includes supplying an output current of the transmitter to the antenna, detecting a strength of an induced voltage generated in the antenna, determining whether the induced voltage is in a predetermined target range based on the detected strength of the induced voltage, and adjusting the output current of the transmitter when the induced voltage is not in the predetermined target range. The method further includes repeating the steps of supplying the output current of the transmitter to the antenna, detecting the strength of the induced voltage, determining whether the induced voltage is in the predetermined target range, and adjusting of the output current, until the induced voltage becomes a final induced voltage which is in the predetermined target range. The method further includes supplying a final output current corresponding the final induced voltage to the antenna.

According to an exemplary embodiment of the present inventive concept, there is provided an electronic system. The electronic system includes an antenna, a contactless communication device, and a matching network. The contactless communication device communicates with a card when the card is positioned within a predetermined range of the contactless communication device. The matching network is connected between the contactless communication device and the antenna. The contactless communication device includes a card detection device and a receiver. The card detection device supplies an induced current to the antenna, monitors a strength of an induced voltage of the antenna, adjusts the strength of the induced voltage generated in the antenna by adjusting the induced current supplied to the antenna, detects whether the card is positioned within the predetermined range, and generates a wake-up signal. The receiver is in a power-down state when the card is out of the predetermined range. The receiver wakes up in response to the wake-up signal, and communicates with the card.

In an exemplary embodiment of the present inventive concept, the contactless communication device may be implemented in a single chip or package, and the antenna and the matching network may be implemented outside the contactless communication device.

According to an exemplary embodiment of the present inventive concept, there is provided a near-field communication (NFC) system. The NFC system includes a reader module and an antenna. The reader module includes a transmitter and an NFC device detector. The reader module transitions from a power-down state to a power-up state when an NFC device is detected in a predetermined range of the NFC system and to communicate with the NFC device. The transmitter supplies an induced current to the antenna and adjusts a strength of an induced voltage generated in the antenna by adjusting the induced current in response to a control signal output from the NFC device detector. The NFC device detector detects the strength of the induced voltage of the antenna, determines whether to adjust the induced current, and outputs the control signal for controlling the induced current to the antenna to the transmitter based on the detected strength of the induced voltage of the antenna.

In an exemplary embodiment of the present inventive concept, the NFC device detector may detect the NFC device positioned within the predetermined range of the NFC system based on a change of the induced voltage.

In an exemplary embodiment of the present inventive concept, the NFC device detector may output the control signal for adjusting the induced current when the induced voltage is not within a predetermined target range.

BRIEF DESCRIPTION OF THE DRAWINGS

The above and other features of the present inventive concept will become more apparent by describing in detail exemplary embodiments thereof with reference to the attached drawings in which.

DETAILED DESCRIPTION OF THE EMBODIMENTS

Figure 1:
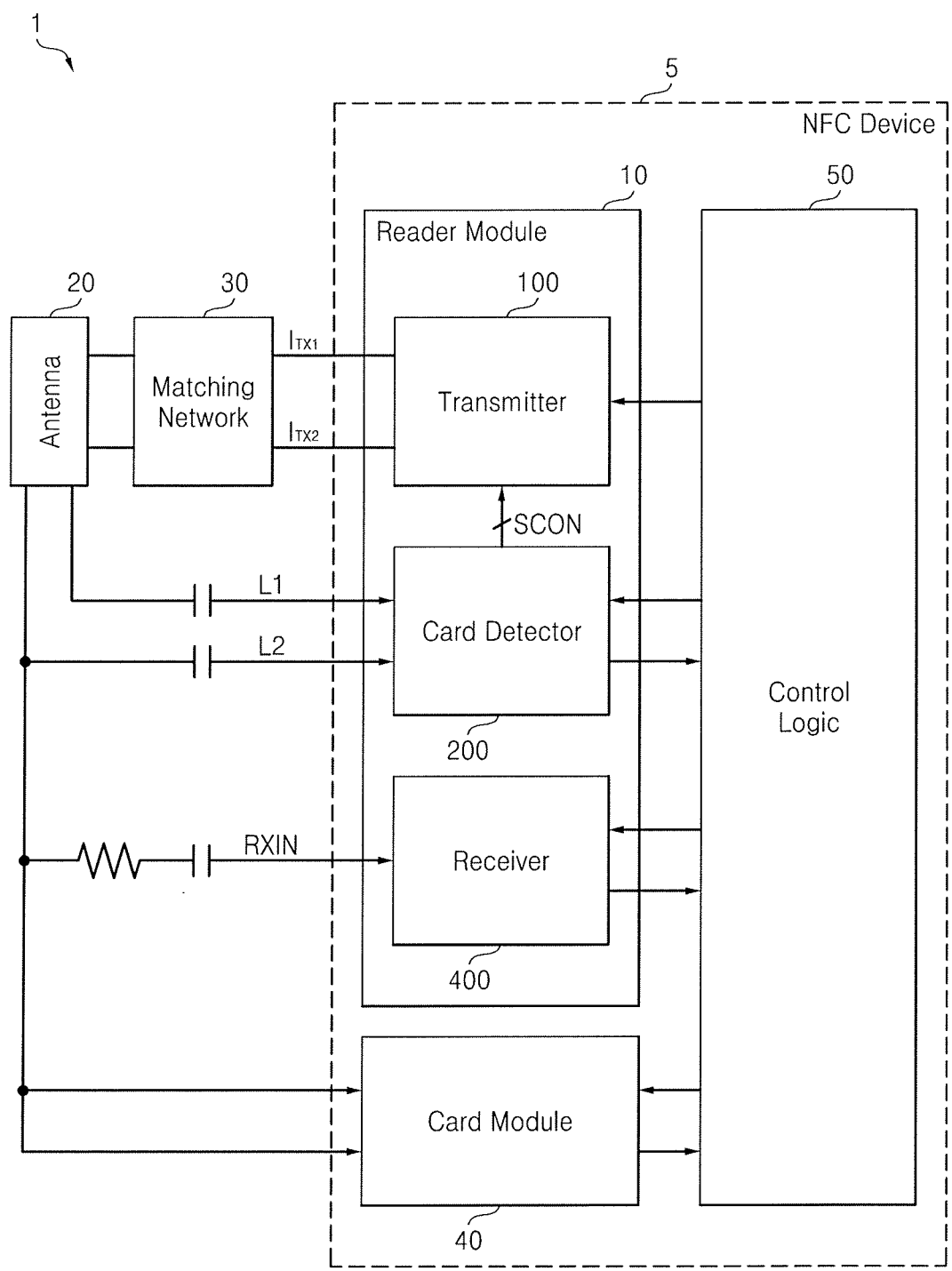
FIG. 1 is a block diagram of a contactless communication system according to an exemplary embodiment of the present inventive concept.

The present inventive concept will now be described more fully hereinafter with reference to the accompanying drawings. The present inventive concept may, however, be embodied in many different forms and should not be construed as being limited to the exemplary embodiments set forth herein. Rather, these exemplary embodiments are provided so that this disclosure will be thorough and complete, and will fully convey the scope of the present inventive concept. In the drawings, the size and relative sizes of layers and regions may be exaggerated for clarity. Like numbers may refer to like elements throughout the specification and drawings.

It will be understood that when an element is referred to as being "connected" or "coupled" to another element, it can be directly connected or coupled to the other element or intervening elements may be present. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present inventive concept.

As used herein, the singular forms "a", "an" and "the" are intended to include the plural forms as well, unless the context clearly indicates otherwise.

FIG. 1 is a block diagram of a contactless communication system 1 according to an exemplary embodiment of the present inventive concept. The contactless communication system 1 includes a contactless communication device 5, an antenna 20, and a matching network 30. The contactless communication system 1 may be a near field communication (NFC) system and the contactless communication device 5 may be an NFC device, but the present inventive concept is not restricted thereto. For example, NFC is a contactless communication technology that is based on radio-frequency identification (RFID) and uses a frequency of 13.56 MHz. Other contactless communication technology may be used.

The contactless communication device 5 includes a reader module 10, a card module 40, and a control logic 50. The contactless communication device 5 may be implemented in a single chip or package. When the NFC tag approaches to the reader module 10, the reader module 10 detects whether an NFC tag is positioned within a predetermined range of the contactless communication device 5 and communicates with the NFC tag to read information from the NFC tag. For example, the NFC tag may be a card including an NFC chip, but the present inventive concept is not limited thereto. The reader module 10 includes a transmitter 100, a card detector 200, and a receiver 400.

The card detector 200 may detect whether a card (e.g., an NFC card) is positioned within the predetermined range of the contactless communication device 5. The reader module 10 may operate in a power-down state (or a sleep mode) when there is no card positioned within the predetermined range of the contactless communication device 5. When the card detector 200 detects a card positioned within the predetermined range of the contactless communication device 5, the reader module 10 wakes up. Thus, the reader module 10 communicates with the card and obtains information from the card.

The matching network 30 is connected between the contactless communication device 5 and the antenna 20, and matches impedance therebetween. The antenna 20 may be implemented as a coil antenna, but the present inventive concept is not restricted thereto.

Although not shown, the card module 40 may include a processor and a memory. The card module 40 may store information in the memory and may communicate with an external card reader through the antenna 20. The control logic 50 controls the operations of the reader module 10 and the card module 40.

The transmitter 100 supplies an induced current $I_{TX1}$ or $I_{TX2}$ (generically denoted by $I_{TX}$) to the antenna 20 so that an induced voltage (e.g., $V_{ANT}$ in FIG. 3) is generated in the antenna 20. Thus, a magnetic field with a predetermined strength may be formed around the antenna 20. For example, the magnetic field may correspond to the induced voltage $V_{ANT}$. The induced voltage $V_{ANT}$ generated in the antenna 20 may vary with the characteristics of the matching network 30 and the antenna 20. In addition, transmitter 100 adjusts the strength of the induced voltage $V_{ANT}$ generated in the antenna 20 by adjusting an amount of the induced current $I_{TX}$ supplied to the antenna 20 in response to a current control signal SCON of the card detector 200, and thus, the strength of the magnetic field at the antenna 20 may be adjusted.

The card detector 200 detects the strength of the induced voltage $V_{ANT}$ generated in the antenna 20 (e.g., the magnetic field strength) and determines whether to adjust the induced current $I_{TX}$. For example, the card detector 200 determines whether the strength of the induced voltage $V_{ANT}$ is within a predetermined target range and outputs the current control signal SCON for changing the induced current $I_{TX}$ when the strength exceeds the predetermined target range. The target range may be defined by a predetermined minimum strength (e.g., TLmin in FIGS. 2A and 2B) and a predetermined maximum strength (e.g., TLmax in FIGS. 2A and 2B), but the present inventive concept is not restricted to this example.

Figure 2A:
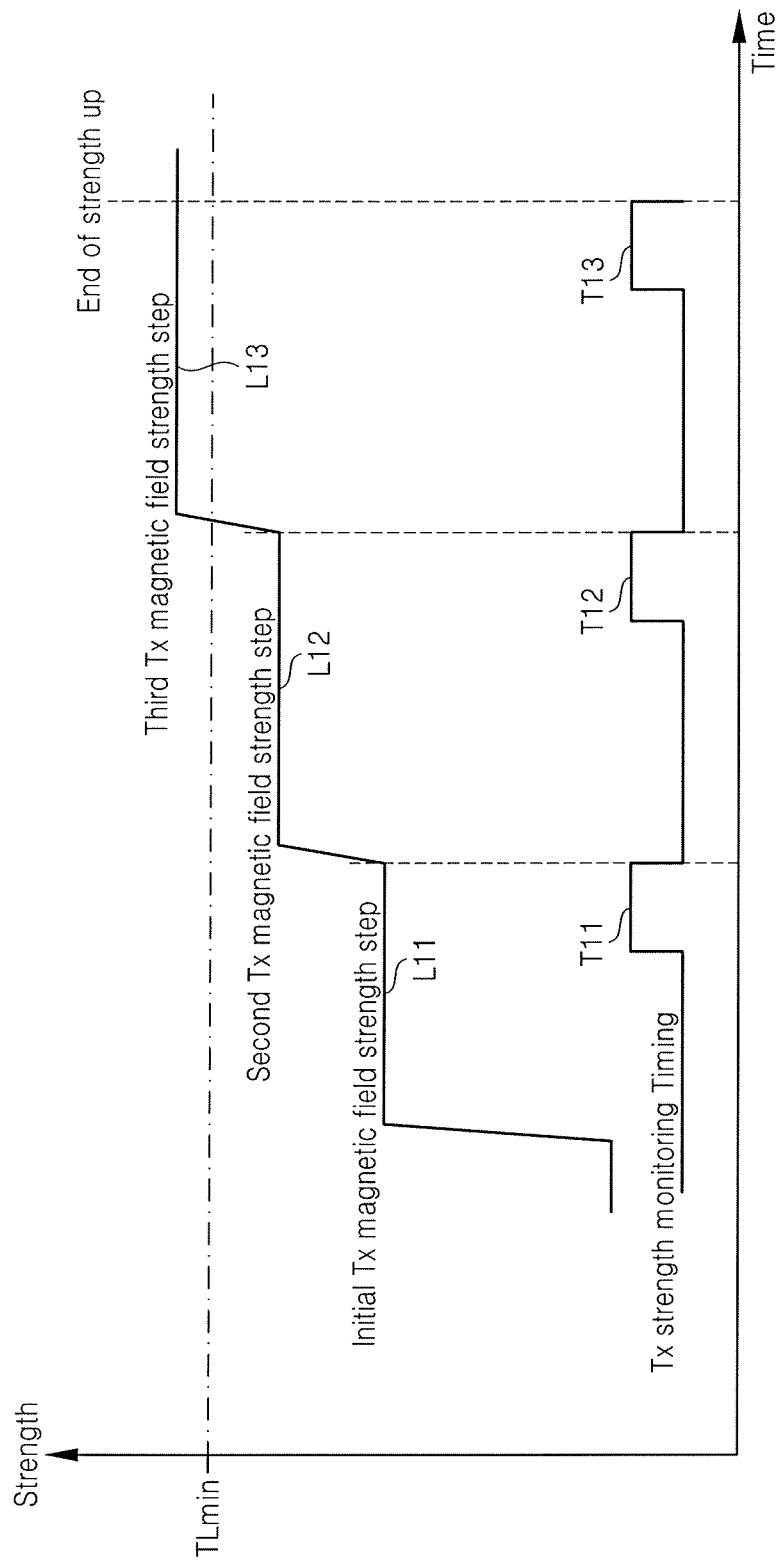
FIGS. 2A and 2B are graphs illustrating a method of adjusting an induced current in a contactless communication system according to an exemplary embodiment of the present inventive concept.

For example, when the strength of the induced voltage $V_{ANT}$ is less than the minimum strength TLmin, the card detector 200 outputs the current control signal SCON for increasing the induced current $I_{TX}$. Then, the transmitter 100 increases the current $I_{TX}$ induced in the antenna 20 in response to the current control signal SCON and the card detector 200 newly detects the strength of the induced voltage $V_{ANT}$. When the newly detected strength is at least the minimum strength TLmin, the card detector 200 does not change the current $I_{TX}$ induced in the antenna 20 and maintains the current $I_{TX}$ at a constant level. The card detector 200 may increase the induced current $I_{TX}$ step-by-step until the strength of the induced voltage $V_{ANT}$ is at least the minimum strength TLmin, as shown in FIG. 2A, and may newly detect the strength of the induced voltage $V_{ANT}$.

Figure 2B:
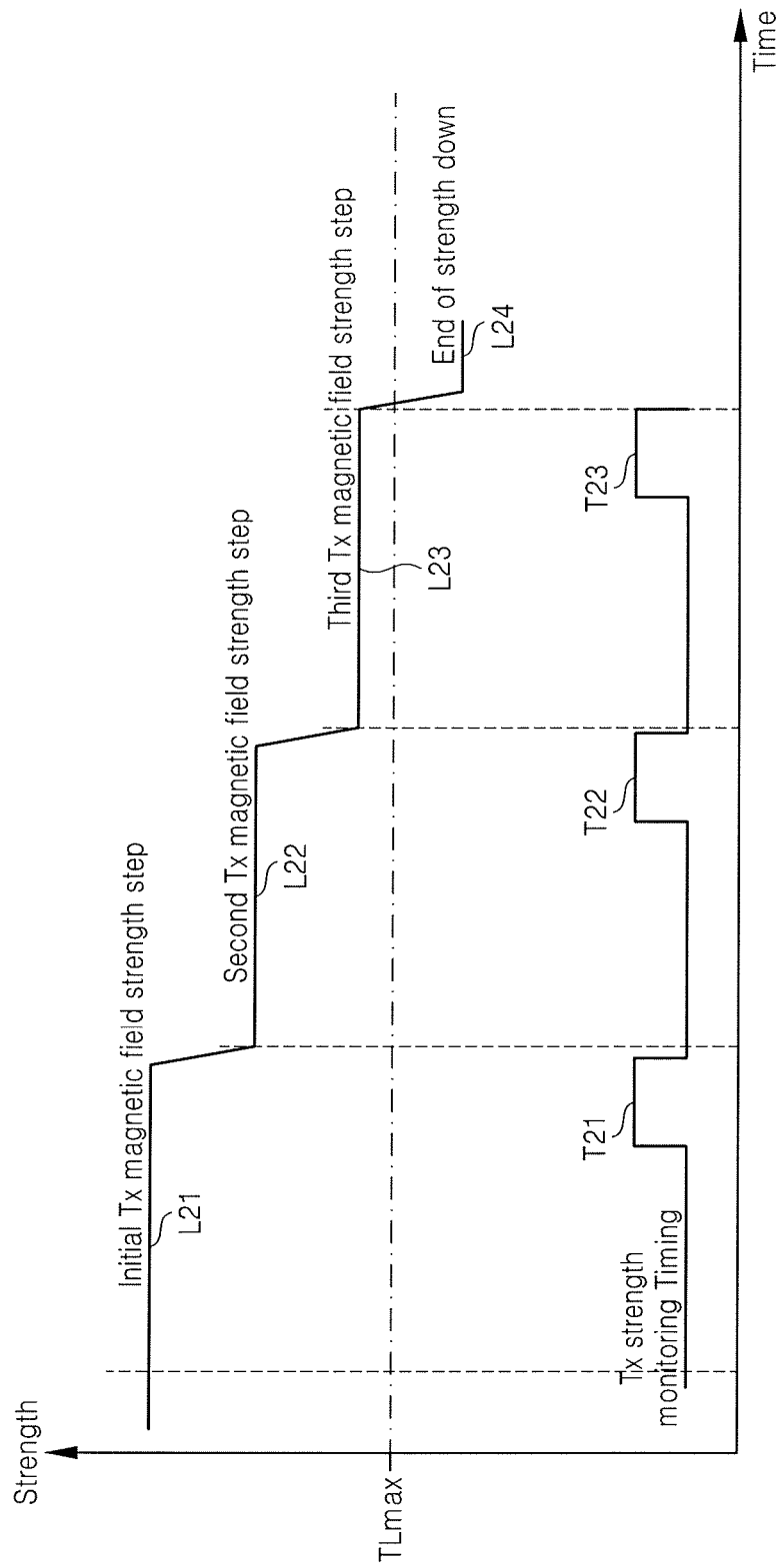

In addition, when the strength of the induced voltage $V_{ANT}$ exceeds the maximum strength TLmax, the card detector 200 outputs the current control signal SCON for decreasing the induced current $I_{TX}$. Then, the transmitter 100 decreases the current $I_{TX}$ induced in the antenna 20 in response to the current control signal SCON and the card detector 200 newly detects the strength of the induced voltage $V_{ANT}$. When the newly detected strength does not exceed the maximum strength TLmax, the card detector 200 does not change the current $I_{TX}$ induced in the antenna 20 and maintains the current $I_{TX}$ at a constant level. The card detector 200 may decrease the induced current $I_{TX}$ step-by-step until the strength of the induced voltage $V_{ANT}$ is less than or equal to the maximum strength TLmax, as shown in FIG. 2B, and may newly detect the strength of the induced voltage $V_{ANT}$.

Such an operation of monitoring the strength of the induced voltage $V_{ANT}$ and adjusting the induced current $I_{TX}$ may be performed in a particular operating mode of the contactless communication system 1. After the induced current $I_{TX}$ is set to an appropriate value through the current adjustment, the contactless communication system 1 may operate in a normal operating mode. In the normal operation mode, the card detector 200 detects that a contactless card is present. For example, the card detector 200 may find out whether a card has approached and is positioned within the predetermined range of the contactless communication device 5 by detecting a change in a magnetic field strength according to the existence or non-existence of the card within the predetermined range of the contactless communication device 5. For clarity of description, the transmitter 100 and the card detector 200 may be referred to as a card detection device.

When a card is detected within the predetermined range of the contactless communication device 5, the card detector 200 may notify the control logic of the detection of the card. The control logic 50 may wake up the receiver 400 according to a wake-up signal of the card detector 200. According to the control of the control logic 50, the receiver 400 may communicate with the card and receive information from the card.

Figure 3:
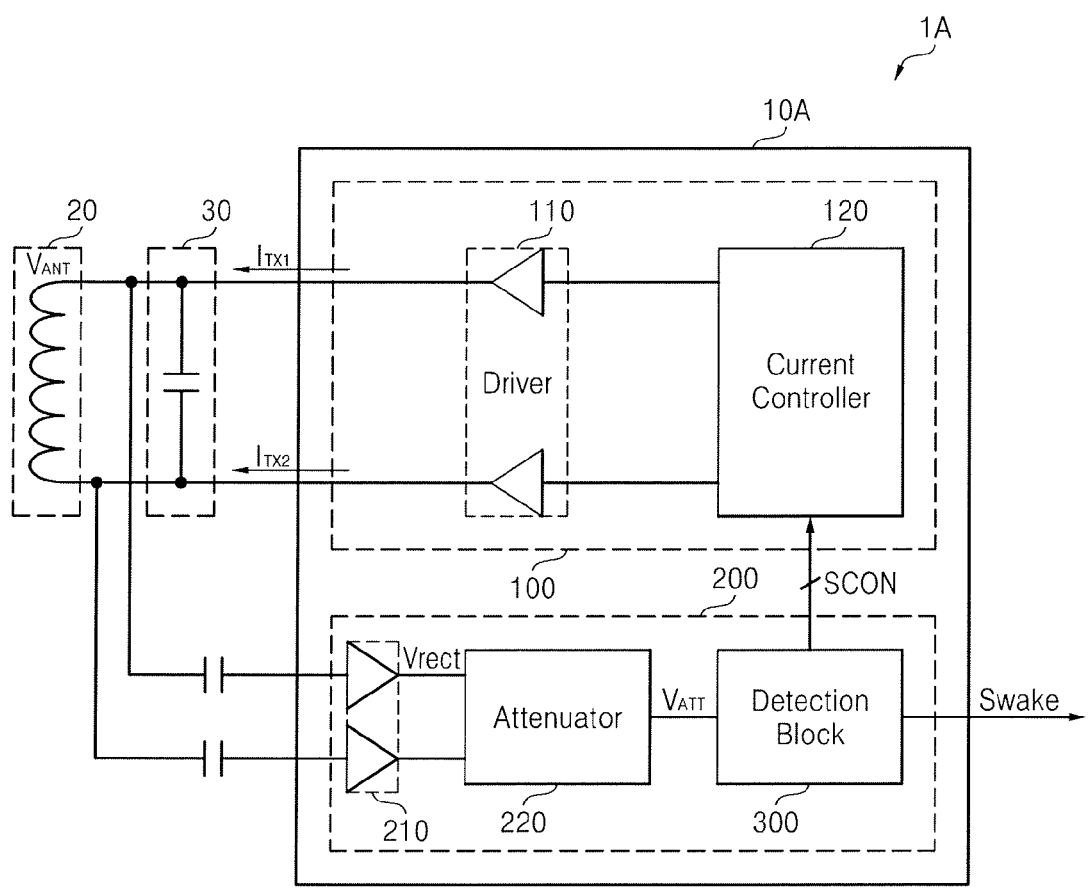
FIG. 3 is a block diagram of a contactless communication system according to an exemplary embodiment of the present inventive concept.

FIG. 3 is a block diagram of a contactless communication system 1A according to an exemplary embodiment of the present inventive concept. The contactless communication system 1A includes a reader module 10A, the antenna 20, and the matching network 30. Although not shown in FIG. 3, the contactless communication system 1A may include the card module 40 and the control logic 50, and the reader module 10A may include the receiver 400 in addition to the transmitter 100 and the card detector 200.

The transmitter 100 includes a driver 110 and a current controller 120. The card detector 200 includes a rectifier 210, an attenuator 220, and a detection block 300.

The rectifier 210 may be connected to the antenna 20, and may receive and rectify the induced voltage $V_{ANT}$ of the antenna 20. The attenuator 220 may receive a rectified voltage Vrect from the rectifier 210 and reduce the level of the rectified voltage Vrect to output an attenuated voltage $V_{ATT}$. The detection block 300 may receive the attenuated voltage $V_{ATT}$, determine whether to adjust the induced current $I_{TX}$, and output the current control signal SCON for changing the induced current $I_{TX}$ according to the determination result.

The current controller 120 controls the driver 110, which drives the induced current $I_{TX}$, in response to the current control signal SCON to adjust the induced current $I_{TX}$. The current controller 120 may control the driver 110 in various manners to adjust the induced current $I_{TX}$ supplied to the antenna 20. For example, the current controller 120 may increase or decrease a size of the driver 110 in response to the current control signal SCON, or may adjust a supply voltage or a gate voltage for the driver 110, and thus, the induced current ITX supplied to the antenna 20 may be adjusted. The size of the driver 110 may relate to the number of turned-on transistors included in the driver 110. The control operation of the current controller 120 is described in detail later.

Figure 4:
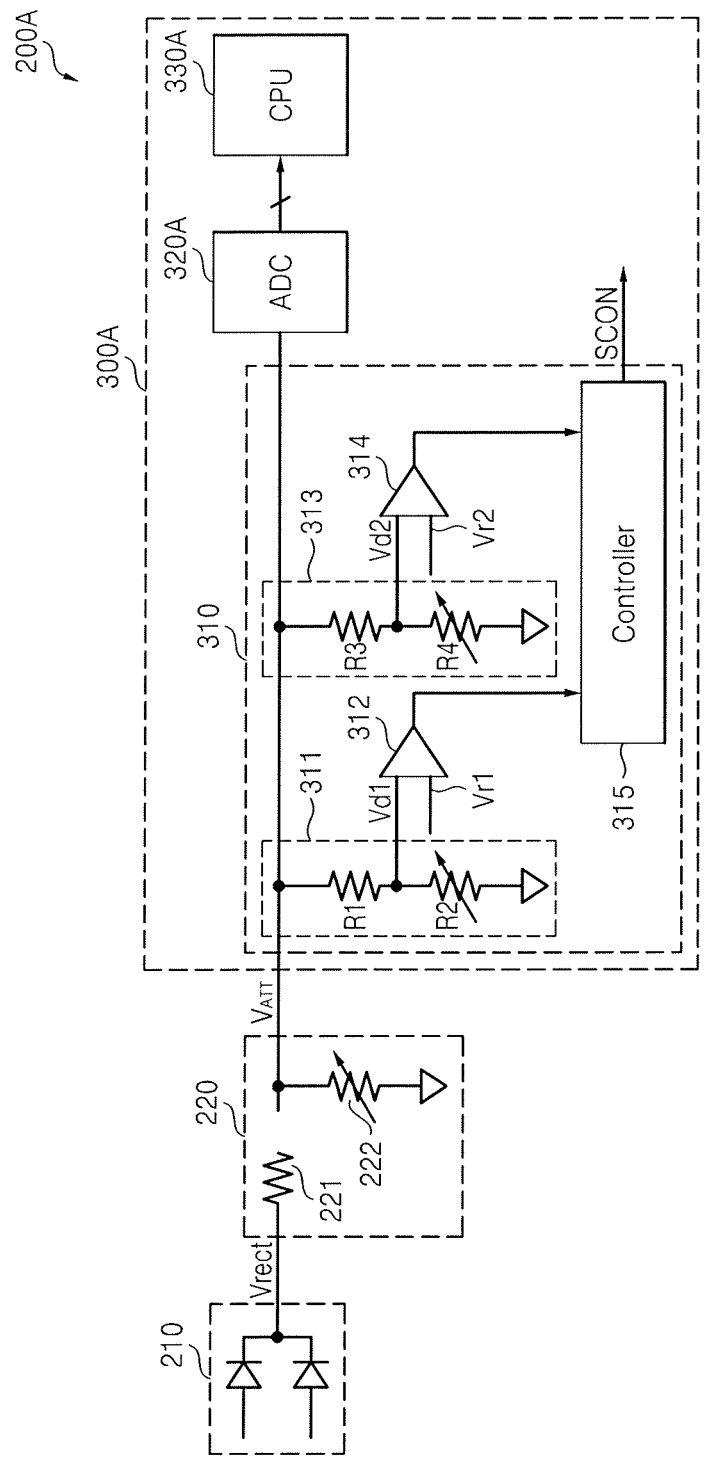
FIG. 4 is a diagram of a card detector illustrated in FIG. 3 according to an exemplary embodiment of the present inventive concept.

FIG. 4 is a diagram of a card detector 200A illustrated in FIG. 3 according to an exemplary embodiment of the present inventive concept. The card detector 200A includes the rectifier 210, the attenuator 220, and a detection block 300A.

The rectifier 210 may include at least one diode. The attenuator 220 may include resistance elements 221 and 222. The resistance element 222 may be a variable resistor.

The detection block 300A may include a monitoring unit 310, an analog-to-digital converter (ADC) 320A, and a central processing unit (CPU) 330A. The monitoring unit 310 includes a first voltage divider 311, a second voltage divider 313, a first comparator 312, a second comparator 314, and a controller 315. The first voltage divider 311 may be implemented using a first resistance element R1 and a second resistance element R2 which is, for example, serially connected to the first resistance element R1. The second voltage divider 313 may be implemented using a third resistance element R3 and a fourth resistance element R4 which is for example, serially connected to the third resistance element R3. The second and fourth resistance elements R2 and R4 may be variable resistors.

The rectified voltage Vrect output from the rectifier 210 is attenuated by the attenuator 220 and transmitted to the first and second voltage dividers 311 and 313. An input voltage of the first comparator 312 is determined according to a resistance ratio R1/R2 of the first voltage divider 311, and an input voltage of the second comparator 314 is determined according to a resistance ratio R3/R4 of the second voltage divider 313. The input voltage of the first comparator 312 is referred to as a first divided voltage Vd1, and the input voltage of the second comparator 314 is referred to as a second divided voltage Vd2. The first divided voltage Vd1 is compared with a first reference voltage Vr1 by the first comparator 312, and the second divided voltage Vd2 is compared with a second reference voltage Vr2 by the second comparator 314.

For instance, the first comparator 312 may output a value of "1" when the first divided voltage Vd1 is greater than the first reference voltage Vr1, otherwise, the first comparator 312 may output a value of "0". The second comparator 313 may output a value of "1" when the second divided voltage Vd2 is greater than the second reference voltage Vr2, otherwise, the second comparator 313 may output a value of "0". The first and second reference voltages Vr1 and Vr2 may be predetermined based on the minimum strength TLmin and the maximum strength TLmax, respectively.

The controller 315 generates the current control signal SCON according to a combination of output signals of the respective comparators 311 and 313. The current control signal SCON may be a digital code including a plurality of bits. For example, when the combination of output signals of the respective comparators 312 and 314 is "00", the controller 315 may output the current control signal SCON for increasing the induced current $I_{TX}$ and may then perform re-monitoring. When the combination of output signals of the respective comparators 312 and 314 is "11", the controller 315 may output the current control signal SCON for decreasing the induced current $I_{TX}$ and perform re-monitoring. When the combination of output signals of the respective comparators 312 and 314 is "10", the controller 315 may determine that the strength of the induced voltage $V_{ANT}$ is a permissible strength, e.g., the strength of the induced voltage $V_{ANT}$ is in the target range, and may perform a card detection operation. During the card detection operation, the current control signal SCON may be maintained constant without a change.

For card detection, the ADC 320A may convert the attenuated voltage $V_{ATT}$ which is an analog voltage signal into a digital signal. The CPU 330A may determine existence or non-existence of a card based on the digital signal output from the ADC 320A.

Figure 5:
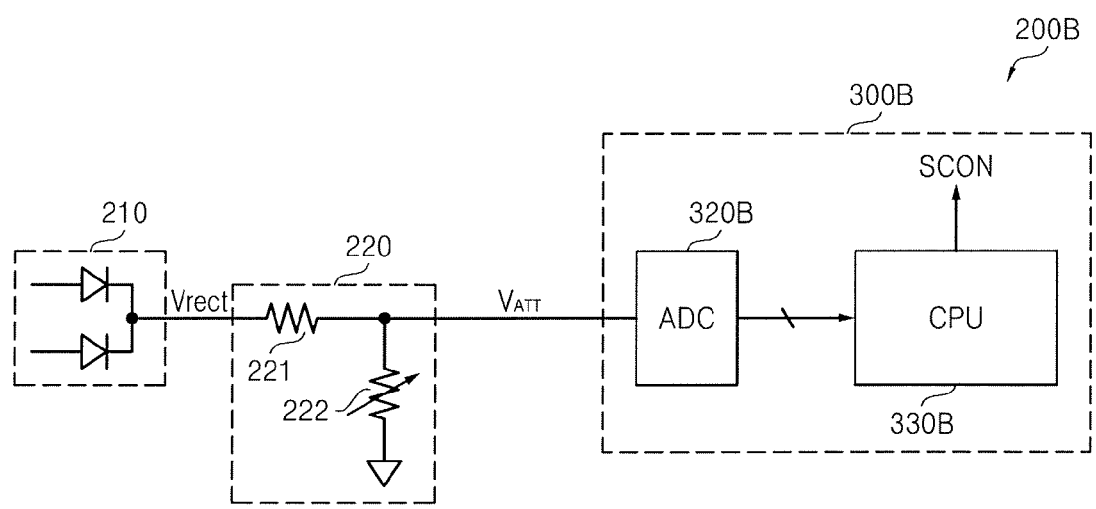
FIG. 5 is a diagram of a card detector illustrated in FIG. 3 according to an exemplary embodiment of the present inventive concept.

FIG. 5 is a diagram of a card detector 200B illustrated in FIG. 3 according to an exemplary embodiment of the present inventive concept. The card detector 200B includes the rectifier 210, the attenuator 220, and a detection block 300B. The rectifier 210 and the attenuator 220 illustrated in FIG. 5 are the same as those illustrated in FIG. 4, and therefore, the detailed descriptions thereof will be omitted.

The detection block 300B may include an ADC 320B and a CPU 330B. The ADC 320B converts the attenuated voltage $V_{ATT}$ from an analog signal into a digital signal (hereinafter, referred to as a "digital detected signal"). The CPU 330B generates the current control signal SCON based on the digital detected signal output from the ADC 320B.

The CPU 330B may determine whether the digital detected signal output from the ADC 320B is in a predetermined reference code range and may output the current control signal SCON for changing the induced current $I_{TX}$ when the digital detected signal is not in the reference code range. The reference code range may be defined by a minimum code corresponding to the minimum strength TLmin and a maximum code corresponding to the maximum strength TLmax.

For example, when the digital detected signal is less than the minimum code, the CPU 330B may output the current control signal SCON for increasing the induced current $I_{TX}$ and may perform re-monitoring. When the digital detected signal is greater than the maximum code, the CPU 330B may output the current control signal SCON for decreasing the induced current $I_{TX}$ and may then perform re-monitoring. When the digital detected signal is at least the minimum code and at most the maximum code, the CPU 330B may determine that the strength of the induced voltage $V_{ANT}$ is a permissible strength, e.g., the strength of the induced voltage $V_{ANT}$ is in the target range and may perform a card detection operation. During the card detection operation, the current control signal SCON may be maintained constant without a change.

During the card detection operation, the ADC 320B may convert the attenuated voltage $V_{ATT}$ which is an analog voltage signal into a digital signal. The CPU 330B may determine existence or non-existence of a card based on the digital signal output from the ADC 320B.

Figure 6:
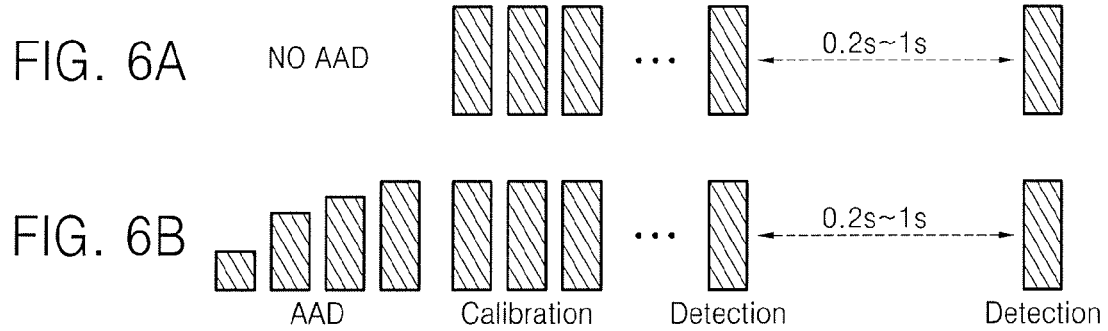
FIG. 6A is a timing chart showing an operation of card detection of a contactless communication system.
FIG. 6B is a timing chart showing an operation of card detection of a contactless communication system according to an exemplary embodiment of the present inventive concept.

FIG. 6A is a timing chart showing an operation of card detection of a contactless communication system. FIG. 6B is a timing chart showing an operation of card detection of a contactless communication system according to an exemplary embodiment of the present inventive concept.

Referring to FIG. 6B, the contactless communication system according to an exemplary embodiment of the present inventive concept has a current adjusting mode AAD and a normal operating mode. The normal operating mode includes a calibration phase and a detection phase.

The contactless communication system illustrated in FIG. 6A might not have the current adjusting mode AAD. Accordingly, an induced current might not be adjusted, and thus, a fixed induced current may be supplied to an antenna in the contactless communication system illustrated in FIG. 6A.

Referring to FIGS. 1 and 6B, the contactless communication system 1 has the current adjusting mode AAD in which the induced current $I_{TX}$ is adjusted before entering a normal mode. The current adjusting mode AAD may come in a power-up sequence of the contactless communication system 1 or may come periodically.

The reader module 10 is in a power-down state in the contactless communication system 1 to reduce the power consumption of the contactless communication system 1. The reader module 10 supplies the induced current $I_{TX}$ to the antenna 20 for a short time at a predetermined interval (e.g., 0.2 to 1 second) in the power-down state, and thus, a short pulse of a magnetic field is formed through the antenna 20. When a card approaches within a predetermined range of the reader module 10 in the detection phase, a level of the short pulse of the magnetic field decreases through the antenna 20 as compared to that in the calibration phase in which there is no card positioned within the predetermined range of the reader module 10. Thus, the card detector 200 of the reader module 10 may detect the level change of the short pulse of the magnetic field and output a wake-up signal Swake (in FIG. 3) to the control logic 50.

In addition, the level of the short pulse of the magnetic field used in the card detection operation may be a major factor in determining the performance of card detection. The level of the short pulse of the magnetic field may be determined by, e.g., the characteristics of an external device for setting a resonant frequency and an antenna, an amount of current induced in the antenna, an external parasitic component, or the like. When an antenna size and a resonant frequency vary depending on various types of contactless communication systems, the level of the short pulse of the magnetic field may change and go beyond a detectable level, and thus, the card detection performance may be reduced.

Thus, the level of the magnetic field short pulse emitted through the antenna 20 may be monitored and the induced current $I_{TX}$ may be adjusted to be in the target range in the current adjusting mode AAD, so that the level of the short pulse of the magnetic field may be adjusted. For example, according to an exemplary embodiment of the present inventive concept, the induced current $I_{TX}$ is adjusted to an optimal value in the current adjusting mode AAD and then the normal operating mode starts. Therefore, the card detection performance may be maintained regardless of the change in characteristics of an external device and an antenna.

Figure 7:
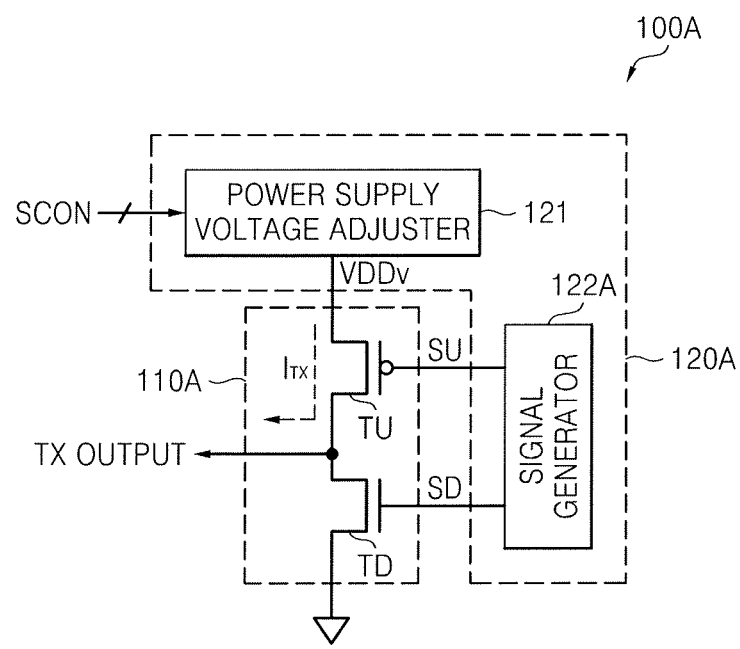
FIGS. 7 through 10 are diagrams of examples of a transmitter illustrated in FIG. 3 according to exemplary embodiments of the present inventive concept.

FIGS. 7 through 10 are diagrams of examples 100A through 100D of the transmitter 100 illustrated in FIG. 3 according to exemplary embodiments of the present inventive concept. Referring to FIG. 7, the transmitter 100A includes a driver 110A and a current controller 120A.

The current controller 120A may include a power supply voltage adjuster 121 and a signal generator 122A. The driver 110A may include a pull-up transistor TU and a pull-down transistor TD.

The signal generator 122A generates a pull-up control signal SU and a pull-down control signal SD for controlling the pull-up transistor TU and the pull-down transistor TD, respectively. The power supply voltage adjuster 121 adjusts a power supply voltage VDDv applied to the driver 110A in response to the current control signal SCON.

Referring to FIG. 7, the power supply voltage VDDv is adjusted in response to the current control signal SCON, so that the output current of the driver 110A (e.g., the induced current $I_{TX}$) is also adjusted.

Figure 8:
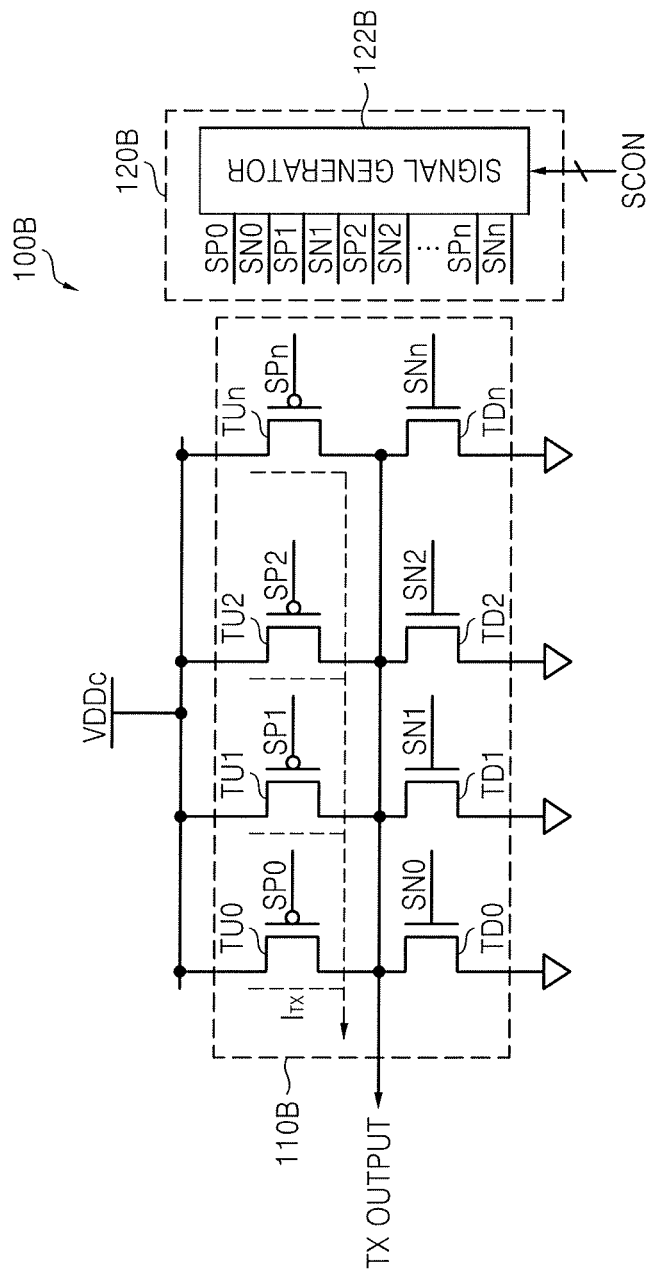

Referring to FIG. 8, the transmitter 100B includes a driver 110B and a current controller 120B. The current controller 120B may include a signal generator 122B. The driver 110B may include pull-up transistors TU0 through TUn and pull-down transistors TD0 through TDn, where n is a positive integer. The signal generator 122B generates pull-up control signals SP0 through SPn for respectively controlling the pull-up transistors TU0 through TUn and pull-down control signals SN0 through SNn for respectively controlling the pull-down transistors TD0 through TDn in response to the current control signal SCON. The number of pull-up transistors turned on among the pull-up transistors TU0 through TUn and the number of pull-down transistors turned on among the pull-down transistors TD0 through TDn may be adjusted according to the current control signal SCON. For example, the size of the driver 110B may be adjusted according to the current control signal SCON. The size of the driver 110B may relate to the number of turned-on transistors included in the driver 110B. For example, the number of turned-on transistors among the pull-up transistors TU0 through TUn and the pull-down transistors TD0 through TDn may be adjusted according to the current control signal SCON. A power supply voltage VDDc applied to the driver 110B may be constant regardless of the current control signal SCON.

Referring to FIG. 8, the size of the driver 110B is adjusted according to the current control signal SCON, so that the output current of the driver 110B (e.g., the induced current $I_{TX}$) is also adjusted.

Figure 9:
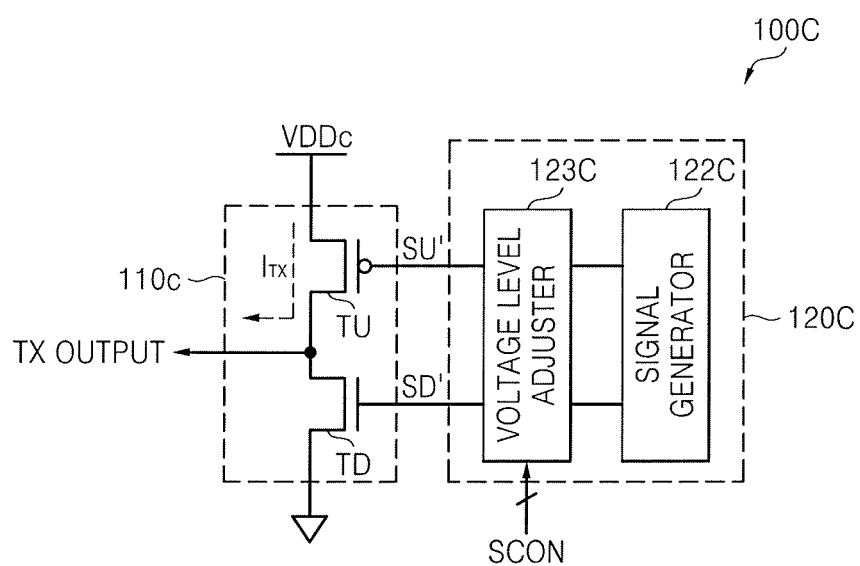

Referring to FIG. 9, the transmitter 100C includes a driver 110C and a current controller 120C. The current controller 120C may include a signal generator 122C and a voltage level adjuster 123C. Similarly to the driver 110A illustrated in FIG. 7, the driver 110C may include the pull-up transistor TU and the pull-down transistor TD.

The signal generator 122C generates the pull-up control signal SU and the pull-down control signal SD for controlling the pull-up transistor TU and the pull-down transistor TD, respectively. The voltage level adjuster 123C adjusts gate voltage levels SU' and SD' of the respective transistors TU and TD in response to the current control signal SCON. The power supply voltage VDDc applied to the driver 110C may be constant regardless of the current control signal SCON.

Referring to FIG. 9, the gate voltage levels SU' and SD' of the pull-up and pull-down transistors TU and TD included in the driver 110C are adjusted in response to the current control signal SCON, so that the output current of the driver 110C (e.g., the induced current $I_{TX}$) is also adjusted.

Figure 10:
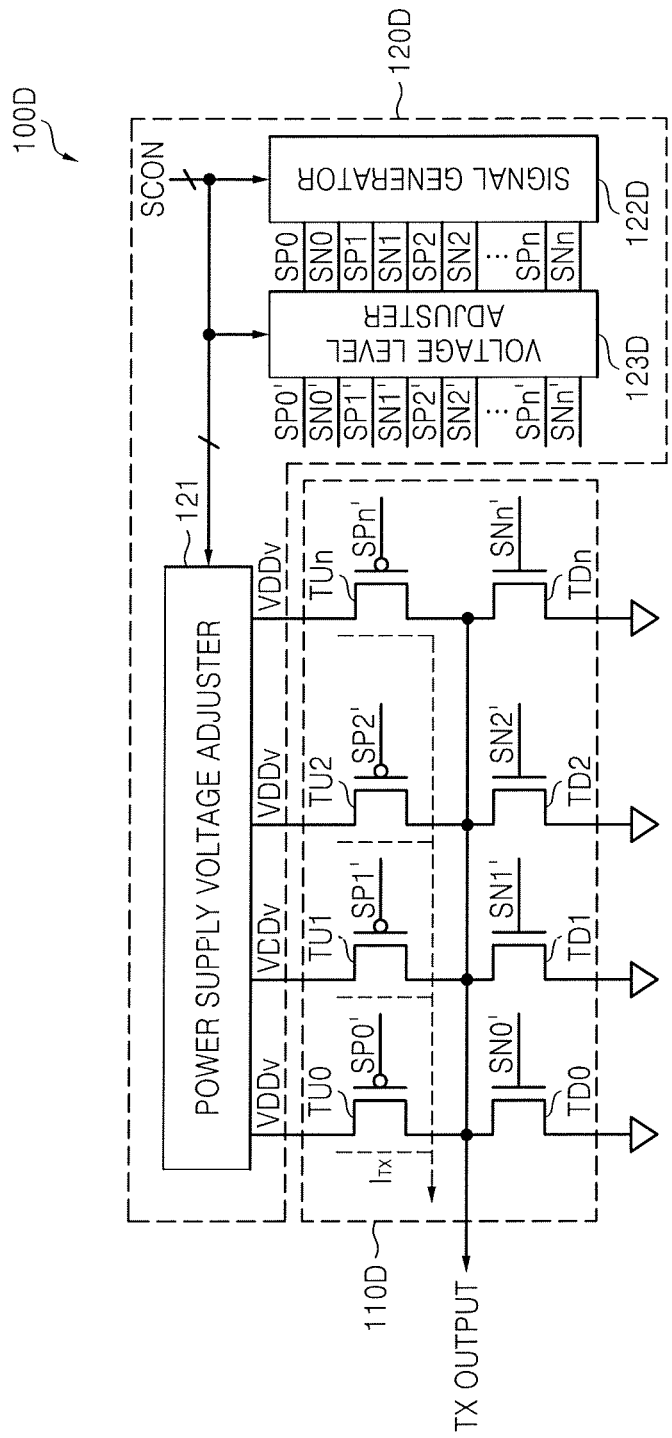

Referring to FIG. 10, the transmitter 100D includes a driver 110D and a current controller 120D. The current controller 120D may include the power supply voltage adjuster 121, a signal generator 122D, and a voltage level adjuster 123D. Similar to the driver 110B illustrated in FIG. 8, the driver 110D may include pull-up transistors TU0 through TUn and pull-down transistors TD0 through TDn.

The signal generator 122D generates the pull-up control signals SP0 through SPn for respectively controlling the pull-up transistors TU0 through TUn and the pull-down control signals SN0 through SNn for respectively controlling the pull-down transistors TD0 through TDn. The voltage level adjuster 123D adjusts gate voltage levels SP0' through SPn' of the respective pull-up transistors TU0 through TUn and gate voltage levels SN0' through SNn' of the respective pull-down transistors TD0 through TDn in response to the current control signal SCON. The power supply voltage adjuster 121 may adjust the power supply voltage VDDv applied to the driver 110D in response to the current control signal SCON.

The transmitter 100D illustrated in FIG. 10 may be a combination of the exemplary embodiments illustrated in FIGS. 7 through 9. Referring to FIG. 10, the power supply voltage VDDv, the size of the driver 110D, the gate voltage levels SP0' through SPn' of the pull-up transistors TU0 through TUn, and the gate voltage levels SN0' through SNn' of the pull-down transistors TD0 through TDn are adjusted in response to the current control signal SCON, so that the output current of the driver 110D (e.g., the induced current $I_{TX}$) is also adjusted.

In an exemplary embodiment of the present inventive concept, at least two configurations of the transmitters 100A through 100D illustrated in FIGS. 7 through 9 may be combined. For example, at least two methods among a method of adjusting a power supply voltage according to the current control signal SCON, a method of adjusting a size of a driver according to the current control signal SCON, and a method of adjusting a gate voltage level of a transistor in a driver according to the current control signal SCON may be combined.

Figure 11:
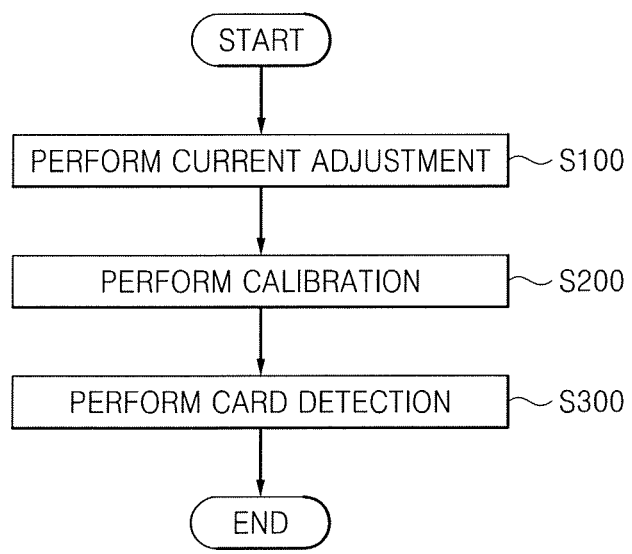
FIG. 11 is a flowchart illustrating a method of operating a contactless communication system according to an exemplary embodiment of the present inventive concept.

FIG. 11 is a flowchart illustrating a method of operating a contactless communication system according to an exemplary embodiment of the present inventive concept. The method illustrated in FIG. 11 may be performed by the contactless communication system 1 illustrated in FIG. 1.

The contactless communication system 1 may perform current adjustment in operation S100 after power-on. Operation S100 may correspond to the current adjusting mode AAD illustrated in FIG. 6B. After setting the induced current $I_{TX}$ to a target value through the current adjustment in operation S100, the contactless communication system 1 enters a normal operating mode, performs calibration in operation S200, and performs card detection in operation S300. Operations S200 and S300 may correspond to the calibration phase and the detection phase, respectively, illustrated in FIG. 6B.

Figure 12:
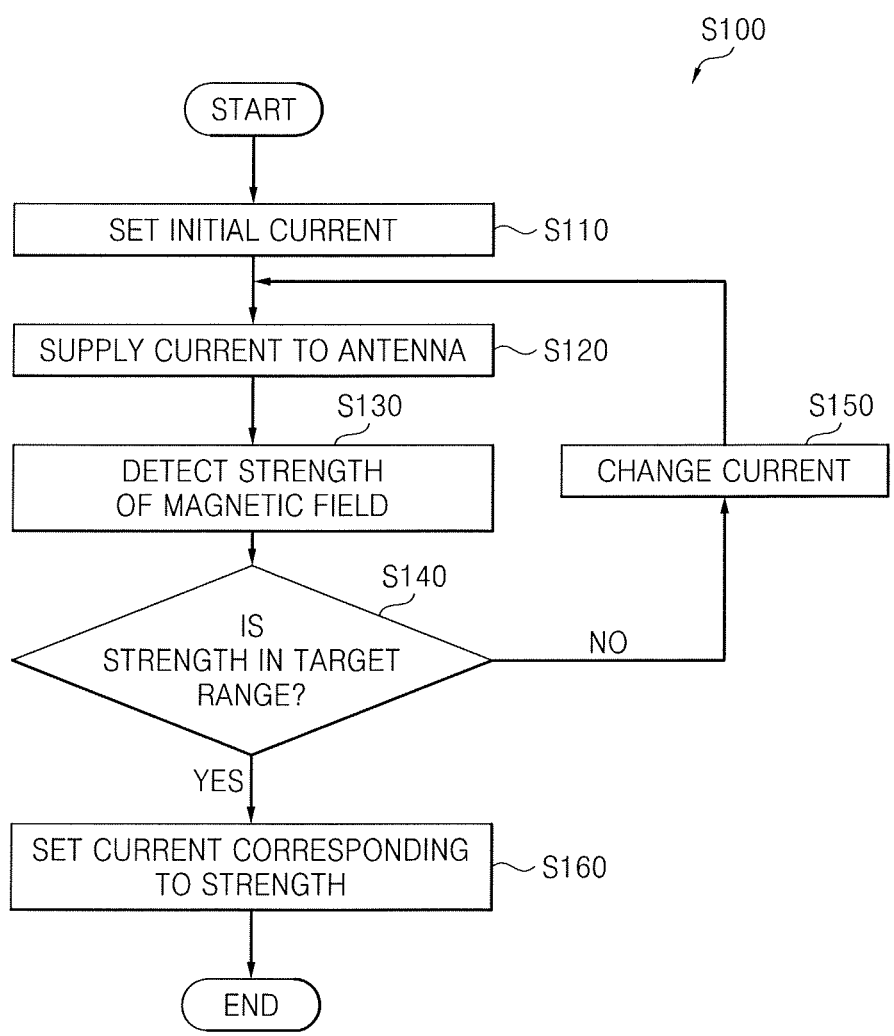
FIG. 12 is a flowchart illustrating a method of adjusting current in a contactless communication system according to an exemplary embodiment of the present inventive concept.

FIG. 12 is a flowchart illustrating a method of adjusting current in a contactless communication system according to an exemplary embodiment of the present inventive concept. The method illustrated in FIG. 12 may be performed in operation S100 illustrated in FIG. 11.

An initial current is set in operation S110. The initial current may be set by setting an initial value of the current control signal SCON.

The current that has been set is supplied to the antenna 20 in operation S120. The reader module 10 detects the strength of the induced voltage $V_{ANT}$ or the strength of the magnetic field generated in the antenna 20 in operation S130. The reader module 10 determines whether the strength of the induced voltage $V_{ANT}$ or the strength of the magnetic field is in a predetermined target range in operation S140 and changes the induced current $I_{TX}$ in operation S150 when the strength of the induced voltage $V_{ANT}$ or the strength of the magnetic field is not in the target range (e.g., NO in operation S140). For example, the reader module 10 increases the induced current $I_{TX}$ when the strength of the induced voltage $V_{ANT}$ or the magnetic field is less than the predetermined minimum strength TLmin and decreases the induced current $I_{TX}$ when the strength of the induced voltage $V_{ANT}$ or the magnetic field exceeds the maximum strength TLmax.

In addition, the reader module 10 supplies the current that has been changed to the antenna 20 in operation S120 and detects the strength of the induced voltage $V_{ANT}$ or the magnetic field generated in the antenna 20 in operation S130. Operations S120 through S150 may be performed repeatedly until the strength of the induced voltage $V_{ANT}$ or the magnetic field becomes in the target range. When the strength of the induced voltage $V_{ANT}$ or the magnetic field is in the target range (e.g., YES in operation S140), a current corresponding to the strength of the induced voltage $V_{ANT}$ or the magnetic field is set in operation S160 and the method ends.

Figure 13:
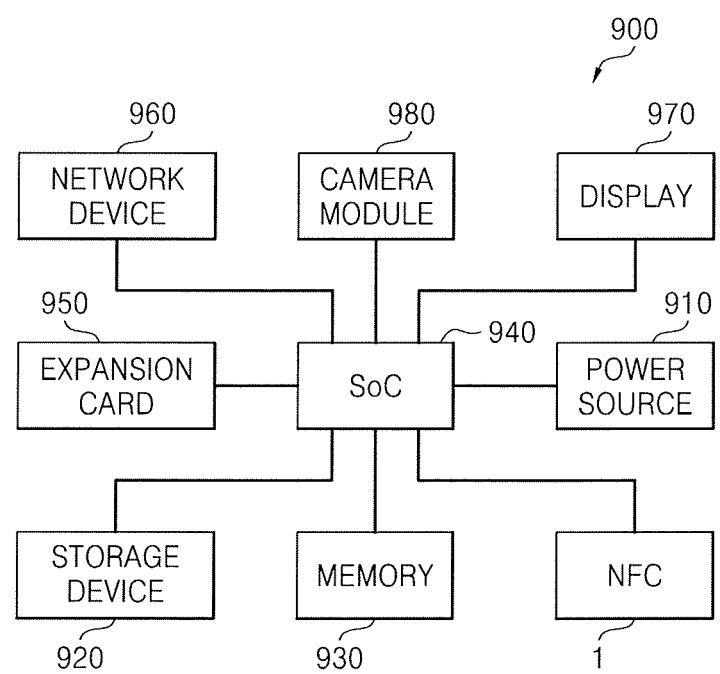
FIG. 13 is a block diagram of an electronic system according to an exemplary embodiment of the present inventive concept.

FIG. 13 is a block diagram of an electronic system 900 according to an exemplary embodiment of the present inventive concept. Referring to FIG. 13, the electronic system 900 may be implemented as a personal computer (PC), a data server, a portable device, or the like.

The portable device may be a laptop computer, a cellular phone, a smart phone, a tablet PC, a personal digital assistant (PDA), an enterprise digital assistant (EDA), a digital still camera, a digital video camera, a portable multimedia player (PMP), portable navigation device (PND), a handheld game console, a smart watch, an e(electronic)-book device, or the like.

The electronic system 900 includes a contactless communication system 1, a power source 910, a storage device 920, a memory 930, a system-on-chip (SoC) 940, an expansion card 950, a network device 960, a display 970, or the like. The electronic system 900 may further include a camera module 980.

The contactless communication system 1 may be an NFC system.

The contactless communication system 1 may include a contactless communication device (e.g., 5 in FIG. 1), an antenna (e.g., 20 in FIG. 1), and a matching network (e.g., 30 in FIG. 1). The contactless communication device detects whether a card is positioned within the predetermined range of the contactless communication device and communicates with the card. The matching network (30 in FIG. 1) is connected between the contactless communication device (e.g., 5 in FIG. 1) and the antenna (e.g., 20 in FIG. 1).

The contactless communication device 5 may be implemented in a single chip or package. The antenna 20 and the matching network 30 may be implemented outside of the chip or package.

For example, when the electronic system 900 uses a battery, the antenna 20 may be implemented by forming a coil at the edge of the portion that the battery is equipped with.

The SoC 940 may control the operation of at least one of the elements 1, and 910 through 980. The power source 910 may supply an operating voltage to at least one of the elements 1, and 320 through 380. The storage device 920 may be implemented by a hard disk drive (HDD), a solid state drive (SSD), or the like.

The memory 930 may be implemented by a volatile or non-volatile memory. The memory 930 may correspond to the memory device 190 illustrated in FIG. 1. A memory controller (not shown) that controls a data access operation, e.g., a read operation, a write operation (or a program operation), an erase operation, or the like, on the memory 930 may be integrated into or embedded in the SoC 940. In an exemplary embodiment of the present inventive concept, the memory controller may be provided between the SoC 940 and the memory 930.

The electronic system 900 may further include I/O ports (not shown) and a camera module 980.

The I/O ports (not shown) may be ports that receive data transmitted to the electronic system 900 or transmit data from the electronic system 900 to an external device. For example, the I/O ports may include ports for connecting with a pointing device such as a computer mouse, a printer, a USB drive, or the like.

The expansion card 950 may be implemented as a secure digital (SD) card, a multimedia card (MMC), or the like. The expansion card 950 may be a subscriber identity module (SIM) card, a universal SIM (USIM) card, or the like.

The network device 960 enables the electronic system 900 to be connected with a wired or wireless network. The display 970 displays data output from the storage device 920, the memory 930, the I/O ports 340, the expansion card 950, the network device 960, or the like.

The camera module 980 converts optical images into electrical images. Accordingly, the electrical images output from the camera module 980 may be stored in the storage module 320, the memory 930, the expansion card 950, or the like. The electrical images output from the camera module 980 may be displayed through the display 320.

As described above, according to an exemplary embodiment of the present inventive concept, the level of the short pulse of the magnetic field emitted through an antenna is monitored and is adjusted to be in an optimal range, so that card detection performance is maintained regardless of the change in characteristics of external devices and the antenna.

While the present inventive concept has been described with reference to exemplary embodiments thereof, it will be understood that the present inventive concept is limited to the disclosed embodiments and various changes in forms and details may be made therein without departing from the spirit and scope of the present inventive concept.

What is claimed is:

1. A detection device, comprising:
    a reader module comprising:
    a transmitter configured, for detecting an external tag, to supply an induced current to an antenna and adjust a strength of an induced voltage generated in the antenna by adjusting the induced current; and
    a detector configured, for detecting the external tag, to monitor the strength of the induced voltage of the antenna and generate a control signal for controlling the induced current to the antenna based on the monitored strength of the induced voltage of the antenna.

2. The detection device of claim 1, wherein the detector comprises:
    a rectifier rectifying the induced voltage and generating a rectified voltage;
    an attenuator attenuating the rectified voltage and generating an attenuated voltage; and
    a detection block comparing at least one voltage generated based on the attenuated voltage with at least one reference voltage and generating the control signal based on the comparison result.

3. The detection device of claim 2, wherein the detection block comprises:
    a first comparator comparing a first voltage obtained by dividing the attenuated voltage with a first reference voltage;
    a second comparator comparing a second voltage obtained by dividing the attenuated voltage with a second reference voltage; and
    a controller generating the current control signal based on output signals of the first and second comparators.

4. The detection device of claim 1, wherein the detector is a card detector and comprises:
    a rectifier rectifying the induced voltage and generating a rectified voltage;
    an attenuator attenuating the rectified voltage and generating an attenuated voltage; and
    a detection block comparing a digital signal generated based on the attenuated voltage with at least one reference code and generating the control signal based on the comparison result.

5. The detection device of claim 4, wherein the detection block comprises:
    an analog-to-digital converter converting the attenuated voltage from an analog signal into the digital signal; and
    a central processing unit comparing the digital signal with a predetermined minimum value and a predetermined maximum value, and generating the control signal.

6. The detection device of claim 1, wherein the detector generates the control signal for increasing the induced current until the strength of the induced voltage is at least a predetermined first strength.

7. The detection device of claim 6, wherein the detector generates the control signal for decreasing the induced current until the strength of the induced voltage is equal to or less than a predetermined second strength, wherein the predetermined second strength is greater than the predetermined first strength.

8. The detection device of claim 1, wherein the transmitter comprises:
    a driver including at least one pull-up transistor and at least one pull-down transistor, and the driver driving the induced current; and
    a current controller controlling the driver in response to the control signal.

9. The detection device of claim 1, wherein the detection device detects whether a near-far field communication (NFC) device is positioned within a predetermined range of the detection device, and communicates with the NFC device.

10. A communication system, comprising:
    an antenna;
    a card detection device supplying an induced current to the antenna for detecting a card, monitoring a strength of an induced voltage of the antenna, adjusting the strength of the induced voltage generated in the antenna by adjusting the induced current supplied to the antenna for detecting the card, detecting whether the card is positioned within a predetermined range of the communication system and if so, generating a wake-up signal; and
    a receiver being in a power-down state when the card is positioned out of the predetermined range of the communication system,
    wherein the receiver wakes up in response to the wake-up signal, and communicates with the card.

11. The communication system of claim 10, wherein the communication system has a current adjusting mode and a normal operating mode for detecting the card, and
    wherein the card detection device monitors the strength of the induced voltage of the antenna and adjusts the induced current to a target current in the current adjusting mode, and
    after the induced current is set to the target current by the adjusting the induced current in the current adjusting mode, the card detection device operates in the normal operating mode.

12. The communication system of claim 11, wherein the card detection device comprises:
    a transmitter adjusting the strength of the induced voltage generated in the antenna by adjusting the induced current; and
    a card detector monitoring the strength of the induced voltage of the antenna and generating a control signal for controlling the induced current to the antenna based on the monitored strength of the induced voltage of the antenna.

13. The communication system of claim 12, wherein the card detector comprises:
    a rectifier rectifying the induced voltage and generating a rectified voltage;
    an attenuator attenuating the rectified voltage and generating an attenuated voltage; and
    a detection block comparing at least one voltage generated based on the attenuated voltage with at least one reference voltage and generating the control signal based on the comparison result.

14. The communication system of claim 13, wherein the detection block comprises:
    a first comparator comparing a first voltage obtained by dividing the attenuated voltage with a first reference voltage;

a second comparator comparing a second voltage obtained by dividing the attenuated voltage with a second reference voltage; and a controller generating the current control signal based on output signals of the first and second comparators.

15. The communication system of claim 12, wherein the card detector comprises:

a rectifier rectifying the induced voltage and generating a rectified voltage;

an attenuator attenuating the rectified voltage and generating an attenuated voltage;

and a detection block comparing a digital signal generated based on the attenuated voltage with at least one reference code and generating the control signal based on the comparison result.

16. The communication system of claim 12, wherein the card detector generates the control signal for increasing the induced current until the strength of the induced voltage is at least a predetermined first strength, wherein the card detector generates the control signal for decreasing the induced current until the strength of the induced voltage is equal to or less than a predetermined second strength, and wherein the predetermined second strength is greater than the predetermined first strength.

17. The communication system of claim 12, wherein the transmitter comprises:

a driver including at least one pull-up transistor and at least one pull-down transistor, and the driver driving the induced current; and a current controller controlling at least one among a power supply voltage applied to the driver, or gate voltages of the at least one pull-up transistor and at least one pull-down transistor in response to the control signal.

18. A near-field communication (NFC) system, comprising:

a reader module including a transmitter and an NFC device detector, wherein the reader module transitions from a power-down state to a power-up state when an NFC device is detected within a predetermined range of the NFC system, and communicates with the NFC device in the power-up state; and an antenna, wherein the transmitter supplies, for detecting the NFC device, an induced current to the antenna and adjusts a strength of an induced voltage generated in the antenna by adjusting the induced current in response to a control signal output from the NFC device detector, wherein, for detecting the NFC device, the NFC device detector detects the strength of the induced voltage of the antenna, determines whether to adjust the induced current, and outputs the control signal for controlling the induced current to the antenna to the transmitter based on the detected strength of the induced voltage of the antenna.

19. The system of claim 18, wherein the NFC device detector detects the NFC device positioned in the predetermined range of the NFC system based on a change of the induced voltage.

20. The system of claim 18, wherein the NFC device detector outputs the control signal for adjusting the induced current when the induced voltage is not in a predetermined target range.

* * * * *